Jan. 13, 1959 W. E. SCHULTE ET AL 2,868,952
MACHINE FOR FABRICATING METAL STRUCTURE
Filed March 13, 1956 3 Sheets-Sheet 3

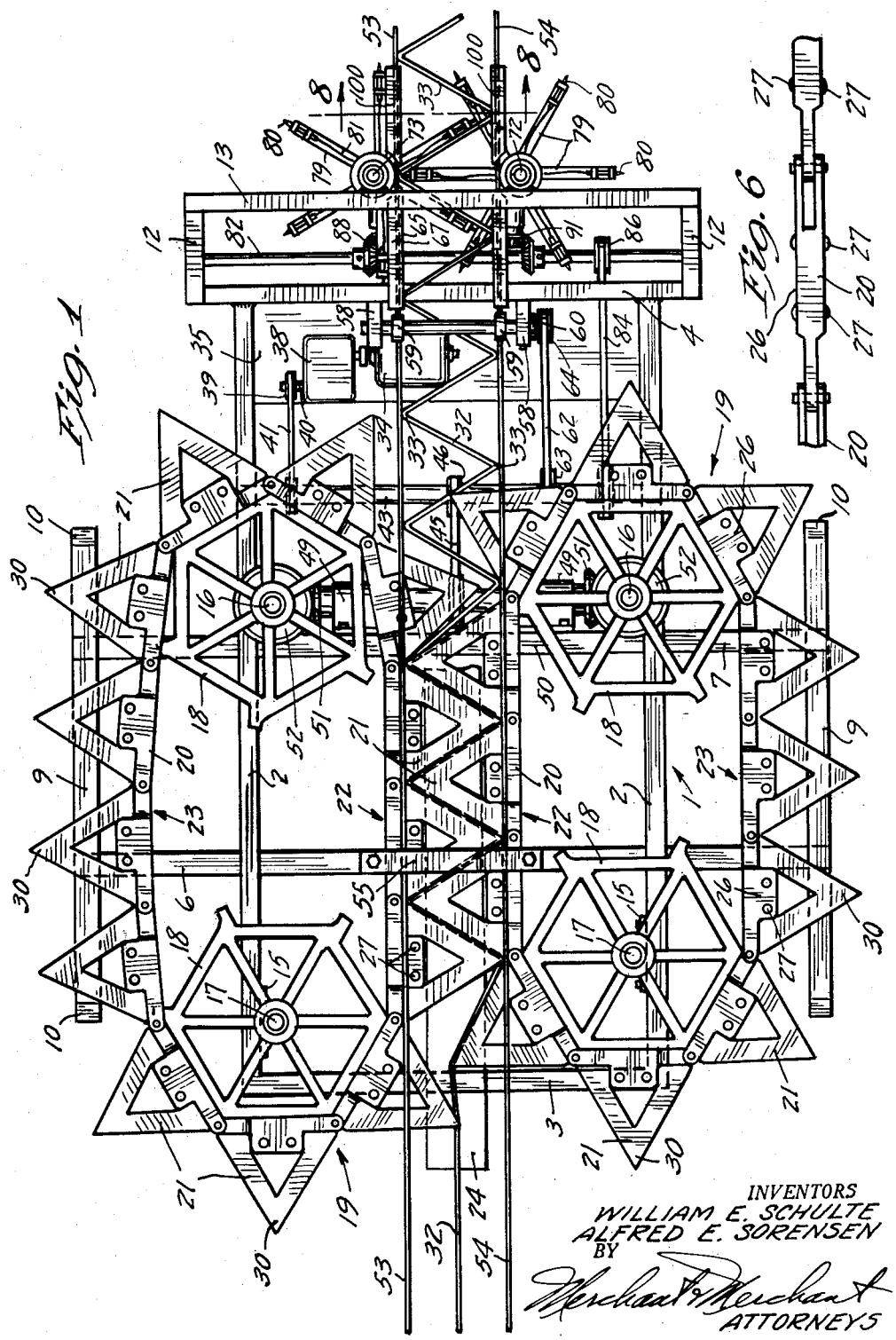

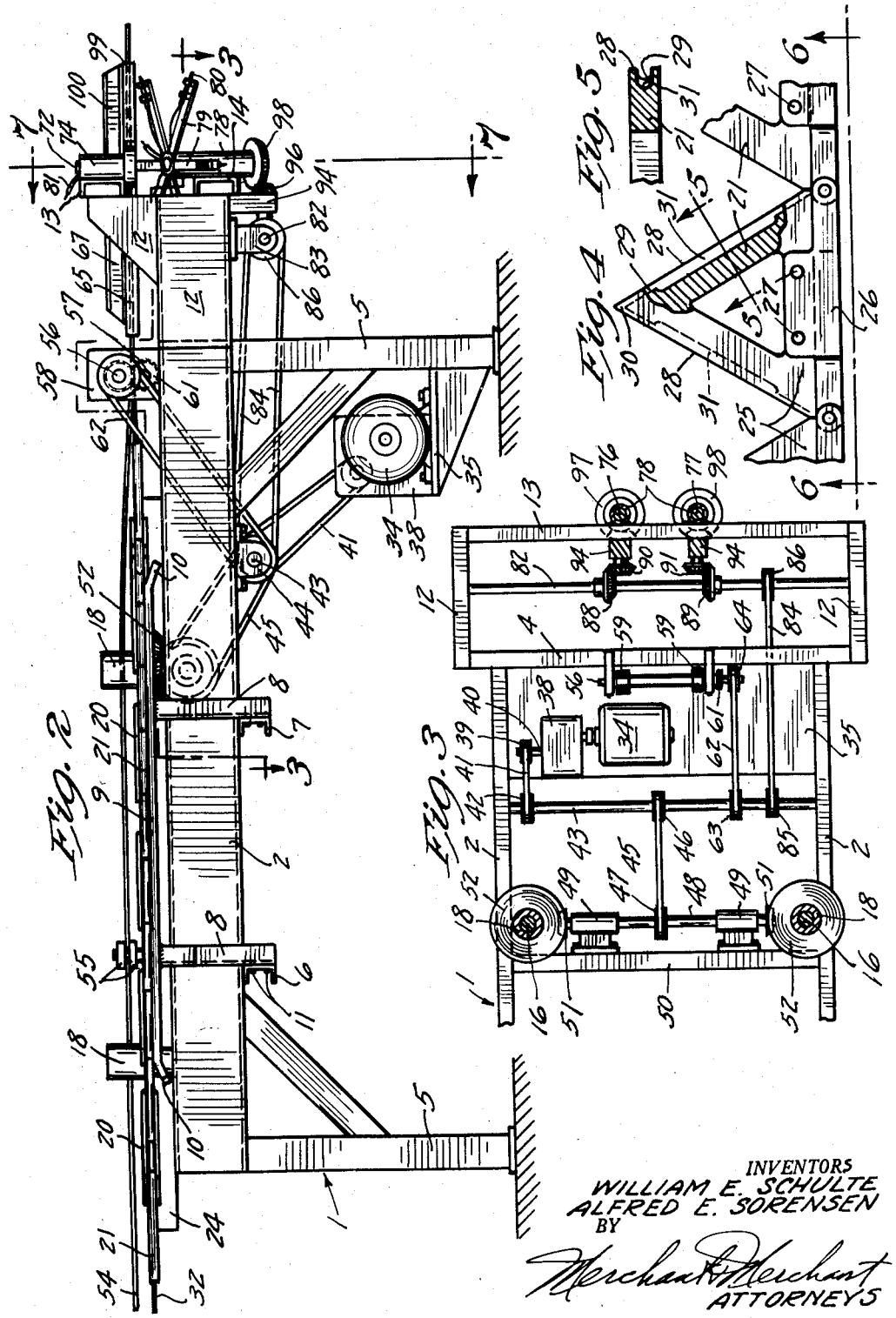

INVENTORS
WILLIAM E. SCHULTE
ALFRED E. SORENSEN
BY
*Merchant & Merchant*
ATTORNEYS United States Patent Office 2,868,952
Patented Jan. 13, 1959

2,868,952

MACHINE FOR FABRICATING METAL STRUCTURE

William E. Schulte and Alfred E. Sorensen, Minneapolis, Minn.

Application March 13, 1956, Serial No. 571,314

7 Claims. (Cl. 219—87)

Our invention relates generally to machines for fabricating metallic articles, and, more particularly, to a machine for making reinforcing members utilized in the building of reinforced concrete structures and the like.

An object of our invention is the provision of a machine for quickly and easily fabricating, from normally straight lengths of metallic rod or bar stock, structure including a pair of laterally spaced generally parallel rods and a connecting rod or bar bent into zig-zag shape and welded to spaced portions of said pair of rods.

Another object of our invention is the provision of a machine which can receive a rod of indeterminate length and bend the same into zig-zag shape progressively from one end to the other thereof without unduly stretching the material of said rod.

Another object of our invention is the provision of a machine as set forth having a plurality of cooperating die elements movable in a common feeding direction and in directions toward and away from each other to bend a rod into generally zig-zag shape during continuous feeding movement of the rod through the machine.

A still further object of our invention is the provision of novel means for mounting the several die elements of our invention whereby the same will be caused to move in feeding and rod bending directions.

Still another object of our invention is the provision of novel welding apparatus having welding electrodes which are movable generally in the direction of forward movement of the material and toward and away from welding engagement therewith, whereby the several parts of the structure may be welded together during continuous movement thereof through the machine.

Another object of our invention is the provision of a machine of the above type which is relatively simple to manufacture, which is efficient in operation, and which is rugged in construction and durable in use.

The above and still further highly important objects and advantages of our invention will become apparent from the following specification, appended claims and attached drawings.

Referring to the drawings, which illustrate the invention and in which like characters indicate like parts throughout the several views:

Fig. 1 is a view in plan of a rod bending and welding machine built in accordance with our invention;

Fig. 2 is a view in side elevation of the machine of Fig. 1;

Fig. 3 is a fragmentary view partly in plan and partly in horizontal section taken substantially on the line 3—3 of Fig. 2;

Fig. 4 is an enlarged fragmentary view in plan of a portion of one of the forming devices of our invention, some parts being broken away and some parts shown in section;

Fig. 5 is a still further enlarged fragmentary view in section taken substantially on the line 5—5 of Fig. 4;

Fig. 6 is a fragmentary view in side elevation as seen from the line 6—6 of Fig. 4;

Fig. 7 is a view partly in vertical section and partly in end elevation, taken substantially on the line 7—7 of Fig. 2; and Fig. 8 is an enlarged fragmentary section taken on the line 8—8 of Fig. 1.

Referring with greater detail to the drawings, the numeral 1 indicates in its entirety a generally rectangular frame comprising a pair of laterally spaced side frame members 2, end frame members 3 and 4 and supporting legs 5. The frame 1 is further braced by a pair of relatively long cross members 6 and 7 which are provided at their outer ends with upstanding arms 8. A pair of supporting bars 9 extend in directions parallel to the side frame members 2, and are each disposed laterally outwardly of a different one of said side frame members 2. The supporting bars 9 are rigidly secured intermediate their ends to the upper ends of the arms 8 and are formed to provide downturned ends 10 for a purpose which will hereinafter be described. The various frame members are preferably rigidly secured together by welding, the arms 8 being secured to the outer ends of their respective cross-frame members 6 and 7 by nut-equipped bolts or the like 11. It will be noted that the end of the machine defined by the end frame member 3 will hereinafter be designated as the "in-put" end of the machine whereas that end adjacent the end frame member 4 will hereinafter be designated as the "discharge" end portion of the machine. The frame 1 further comprises a relatively short extension frame which includes a pair of laterally spaced frame members 12 projecting rearwardly from opposite ends of the end frame member 4 and a pair of vertically spaced upper and lower cross members 13 and 14 respectively bolted or otherwise rigidly secured to the rear ends of the members 12.

Rigidly secured to the intermediate portion of each of the side frame members 2 is one of a pair of bearing brackets 15, each journalling a vertically disposed drive shaft 16. Similar bearing brackets 15 are secured to the side frame members 2 adjacent the in-put end of the machine, these latter bearing brackets journalling vertically disposed idler shafts 17. Sprocket wheels 18 are keyed or otherwise rigidly secured to the upper ends of the shafts 16 and 17 respectively, and are supported thereon above the horizontal plane of the tops of the side frame members 2.

Mounted for feeding movements generally longitudinally of the frame 1 is a pair of forming or bending devices 19 each comprising an endless link chain 20 and a plurality of die elements 21 rigidly mounted on the chains 20 for common movements therewith. The chain 20 of one of the forming devices 19 runs over the sprockets 18 adjacent one of the frame members 2, whereas the chain 20 of the cooperating forming device 19 runs over the sprocket wheels 18 adjacent the other side frame member 2, the chains 20 each defining feeding flights 22 adjacent the transversely central portion of the frame 1, and return flights 23 laterally outwardly spaced therefrom, and positioned so that the die elements of the return flights 23 are adapted to rest upon and be supported by the supporting bars 9 adjacent thereto. With reference to Figs. 1 and 2, it will be seen that the die elements 21 associated with the feeding flights 22 rest upon and are supported by a longitudinally extended supporting plate 24 suitably mounted in the frame 1.

The generally tooth-like die elements of each of the forming devices 19 are identical, and have the form of isosceles triangles, the base portions 25 thereof each being riveted or otherwise anchored to a different link 26 of the chains 20, as indicated at 27, see particularly Fig. 4. The sides 28 of each die element 21, being of equal length, are provided with rod-receiving grooves 29 of equal depth at the base portions 25 and at the apex portions 30 of each die element 21. Intermediate the base and apex portions 25 and 30 respectively, the grooves 29 are relieved or deepened as indicated at 31 in Figs. 4 and 5, the depth of the groove 29 at the base and apex portions being substantially one half the thickness or diameter of the material to be formed thereby.

Several sprocket wheels 18 are adapted to be rotated in directions to cause feeding movement of the chains 20 and die elements 21 in directions whereby the feeding flights 22 thereof move from the in-put end of the machine toward the discharge end thereof. With reference to Fig. 1 it will be seen that each triangular die element 21 moves into a V-shaped notch defined by the die elements of an adjacent pair of the opposite forming device 19, the die elements 21 of one of the forming devices 19 having intermeshing engagement with die elements of the other forming device 19 when said die elements are positioned in the feeding flights 22. Cooperating die elements 21 when moving circumferentially into feeding flight positions, are adapted to receive therebetween an elongated metallic rod 32 and feed the same toward the discharge end of the machine. As the rod 32 is engaged by the die elements 21, the same is bent into generally zig-zag form, the rod 32 being received in the grooves 29 of the die elements. Obviously, the rod 32 will be bent at longitudinally spaced intervals, the angle of each bend being substantially equal to the angle between the sides 28 of each die element 21. As the die elements 21 of each forming device 19 move away from each other, the corner 33 of the angles of the bent rod 32 are received within the relieved or deepened portions 31 of at least one of the die elements leaving the feeding flight 22, so that there is substantially no distortion of the zig-zag shape of the bent portion of the rod 32 when it is released from the forming devices 19. Actually, during the initial separation between the die elements 21 of one of the forming devices and the cooperating die elements of the other thereof, the angles of the bends in the rod 32 are enlarged very slightly. However, there is sufficient resilience in the rod 32 to enable the same to spring back to the precise zig-zag shape imparted thereto by the die elements 21. Thus, the entire length of the rod 32 is formed with angular bends of a relatively high degree of uniformity.

Means for imparting rod bending and feeding movements to the forming devices 19 comprises a motor 34 and driving connections therebetween and the shafts 16 now to be described. The motor 34 is mounted on a platform 35 which extends between and is rigidly secured to the legs 5 at the discharge end portion of the machine. The drive shaft 36 of the motor is coupled to the in-put shaft 37 of a speed reduction transmission mechanism, not shown but contained within a housing 38. A pulley 39 is rigidly mounted on the out-put shaft 40 of the transmission mechanism, and has running thereover an endless belt 41 which also runs over a second pulley 42 fast on a jack shaft 43 that is journalled in suitable bearings 44 mounted on the frame 1. A second endless belt 45 runs over a pulley 46 fast on the jack shaft 43 and over another pulley 47 that is mounted fast on a shaft 48 journalled in spaced bearings 49 that are rigidly mounted on a cross member 50 welded at its opposite ends to the side frame members 2 above the adjacent cross member 7. Toothed bevel pinions 51 are rigidly secured one each to an opposite end of the shaft 48 and have meshing engagement each with one of a pair of bevel gears 52 that are rigidly mounted one each to a different one of the shafts 16. The arrangement is such that the shafts 16 are rotated in opposite directions whereby to impart feeding movement to the flights 22 in a common direction. Thus, the die elements 21 when carried by the sprocket wheels 18 adjacent the in-put end of the machine approach intermeshing engagement with each other, while those carried by the sprocket wheels 18 adjacent the discharge end portion of the machine move generally transversely in a direction away from said intermeshing engagement. Due to the fact that the feeding movement of the forming devices 19 is imparted thereto by the shafts 16, some slack occurs in the return flights 23. This slack, in addition to the operating clearance between the several links 26 of the chains 20 causes the apex portions 30 of the forming devices to drop slightly while the die elements 21 are being moved from the feeding flights 22 toward the return flights 23. The downturned angular portions 10 of the supporting bars or rails 9 engage the die elements 21 and support the same during travel on the return flight.

For the purpose of utilizing the formed or bent rod 32 to provide a reinforcing member adapted to be imbedded in concrete structures for reinforcing the same or for use as truss members in different types of construction, we provide means for feeding a pair of relatively straight, laterally spaced metallic rods 53 and 54 through the machine together with the rod 32, and for welding the rods 53 and 54 to adjacent corners 33 of the angles formed in the bent rod 32. The rods 53 are fed through the machine in overlying relationship to the base portions 25 of the die elements 21 in the feeding flights 22, and are supported above the plane of the forming devices 19 by the lower one of a pair of guide bars 55 which are suitably mounted in the frame 1 above the cross frame member 6. With reference to Fig. 1 it will be seen that the guide bars 55 extend transversely of the direction of feeding movement of the die elements 21 and form a bridge over the feeding flight 22 thereof. A pair of cooperating shafts 56 and 57 are journalled in laterally spaced bearing brackets 58 mounted on the cross spring member 4, the shaft 56 overlying the shaft 57. The shafts 56 and 57 are each provided with a pair of diametrically enlarged feeding collars or the like 59, only the upper pair of which is shown, see particularly Figs. 1 and 3. The shafts 56 and 57 are connected, adjacent one of the bearing brackets 58, by a pair of gears 60 and 61, the former of which is rigidly secured to the shaft 56 and the latter of which is rigidly secured to the shaft 57. The shaft 56 is coupled to the jack shaft 43 for common rotation therewith by an endless belt 62 running over a pulley 63 fast on the jack shaft 43 and another pulley 64 fast on one end of the shaft 56. With reference particularly to Fig. 2, it will be seen that, although the bars 53 and 54 are carried above the plane of the rod 32 during its movement between the forming devices 19, the said collars 59 guide the bars 53 and 54 into a common plane with the bent rod 32 after the same has been discharged from the forming devices 19. A pair of guide rails 65 carried by the cross frame member 13 are provided with opposed channels 66 which receive the rods 53 and 54 and the corners 33 of the bent rod 32 to hold the same in coplanar relationship during movement of said rods toward the welding means of our invention. With reference particularly to Figs. 2 and 8, it will be seen that the guide rails 65 are further supported by channel members 67 welded or otherwise rigidly secured at their rear ends to the cross member 13.

For the purpose of welding the corner portions 33 of the bent rod 32 to longitudinally spaced portions of the adjacent relatively straight rods 53 and 54, we provide a pair of welding devices each comprising a generally cylindrical rotary electrode and a spoked rotor carrying a plurality of circumferentially spaced radially outwardly projecting electrodes. The generally cylindrical electrode of one of the welding devices is designated and a spoked rotor cooperating therewith is indicated generally at 69. The generally cylindrical electrode of the other welding device is indicated at 70, the spoked electrode cooperating therewith being indicated generally by the numeral 71. The rotary electrodes 68 and 70 are each mounted on the lower end of a respective vertically extending shaft 72 and 73 that are journalled in spaced bearings 74 and 75 respectively, rigidly secured to the cross member 13. With reference particularly to Fig. 6 it will be noted that the electrodes 68 and 70 lie in the horizontal plane of the guide channels 66 of the guide rails 65, and in closely spaced relation to the rear ends thereof, whereby to engage the laterally outer surface portions of the rods 53 and 54 as the same leave the channels 66. The spoked rotors 69 and 71 are rigidly mounted on drive shafts 76 and 77 respectively, that are journalled in bearings 78, rigidly secured to the cross member 14, for rotation about upwardly diverging axes which intersect the axes of the adjacent shafts 72 and 73. The upward divergence of the shafts 76 and 77 causes the planes of the spoked rotors 69 and 71 to intersect substantially at the lateral center of the machine, see Fig. 6. Preferably, the rotors 69 and 71, as above indicated, are provided with a plurality of radially outwardly extending spokes or the like 79, on each of which is mounted a radially outwardly projecting electrode element 80. With reference to Fig. 1 it will be seen that, during rotation of the spoked rotors 69 and 71, the spokes 79 of one thereof will pass between adjacent spokes of the other thereof in the manner of meshing gears, but without making contact with one another. During passage of the bent rod 32 and the relatively straight rods 53 and 54 beyond the guide channels 66, the outer ends of the electrodes 80 will engage the inner portions of successive corners 33 whereby to weld the corner portions 33 to longitudinally spaced portions of the adjacent relatively straight rods 53 and 54. Electrical energy is provided to the electrodes 68 and 70 and to the several electrodes 80 by power-conductor cables 81 from a suitable source of supply not shown. The source of electrical energy for welding may be any one of a number of well-known transformer devices used in the welding art.

Means for rotating the shafts 76 and 77 and their respective rotors 69 and 71 includes a transverse shaft 82 journalled in bearings 83 that are rigidly secured to the frame members 12. A drive belt 84 runs over a pulley 85 on the jack shaft 43 and over another pulley 86 fast on the shaft 82. A pair of axially spaced bevel gears 88 and 89 are mounted on the shaft 82 in opposed relationship, each having meshing engagement with a respective one of a pair of cooperating bevel gears 90 and 91 that are rigidly secured to one end of a respective shaft 92 and 93. The shafts 92 and 93 are journalled in spaced bearings 94 which are rigidly secured to and depend from the frame member 14. Bevel gears 95 and 96 are rigidly secured to the outer ends of the shafts 92 and 93 respectively, and have meshing engagement with respect of relatively large bevel gears 97 and 98 that are rigidly secured to the lower ends of the shafts 76 and 77, respectively. The arrangement of gears for driving the rotors 69 and 71 is such that the rotor 69 is driven in a counterclockwise direction with respect to Fig. 1, whereas the rotor 71 is driven in a clockwise direction with respect to Fig. 1. The rotors 69 and 71 are driven at peripheral speeds equal to the rate of movement of the bent rod 32 and the straight rods 53 and 54 through the machine, so that each electrode 80 has welding contact with the inner portion of its engaged corner 33 of the bent rod 32 for a length of time sufficient to properly weld the same to the engaged portion of the adjacent relatively straight rod. The generally cylindrical electrodes 68 and 70 are in constant engagement with their respective straight rods 54 and 53 and, being more or less freely mounted to their respective bearings 74 and 75, are rotated by the frictional engagement of the rods thereagainst. Although not shown, it may be assumed that the several welding electrodes are suitably insulated from the machine.

As the welded structure leaves the machine, it is supported for a short distance by laterally spaced guide rails 99 similar to the guide rails 65. The guide rails 99 are supported by truss members 100 that extend rearwardly from, and which are welded or otherwise rigidly secured to the cross member 13 at the discharge end of the machine. Upon leaving the guide rails 99, the welded structure may be guided to a suitable place for cooling by any suitable means not shown.

Our invention has been thoroughly tested and found to be entirely adequate for the purpose of bending and welding metallic rods to provide a fabricated structure of the type herein disclosed, in a rigid and efficient manner; and while we have shown and described a preferred embodiment of our novel machine, it will be understood that the same is capable of modification without departure from the spirit and scope of the invention as defined in the claims.

What I claim is:

1. In a machine for making fabricated metal structures, a pair of cooperating forming devices adapted to receive an elongated metallic rod therebetween, each of said forming devices comprising a plurality of tooth-like die elements, means pivotally connecting the die elements of each of said forming devices together to provide endless chains, die elements of each chain thereof intermeshing with cooperating die elements of the other chain thereof, and means for imparting movement to said forming devices to cause said intermeshing die elements to travel in a common feeding direction, engagement of said rod by the intermeshing die elements causing said rod to be bent into generally zig-zag form progressively from one end to the other thereof.

2. The structure defined in claim 1 in which said tooth-like die elements have opposite sides covering toward the other chain thereof, said sides defining longitudinally-extending rod-receiving grooves having a depth at their outer end portions substantially one-half of the thickness of said rod, said grooves inwardly of said outer end portions being deeper than at said outer end portions.

3. In a machine for making fabricated metal structures, a pair of endless chains, means including a pair of sprocket wheels for each of said chains for mounting said chains in a common plane with adjacent feeding flights thereof in spaced parallel relationship, a plurality of tooth-like die elements on each of said chains, the die elements on the feeding flight of one of said chains having intermeshing engagement with the die elements on the feeding flight of the other said chains, said intermeshing die elements being adapted to receive an elongated metallic rod therebetween, and means for imparting feeding movement to said chains in a direction to cause said intermeshing die elements to receive and bend said rod into generally zig-zag form progressively from one end to the other thereof.

4. In a machine for making fabricated metal structures, a pair of endless chains, means including a pair of sprocket wheels for each of said chains for mounting said chains in a common plane with adjacent feeding flights thereof in spaced parallel relationship, a plurality of triangular die elements connected at their bases to each of said chains in side by side relationship, adjacent pair of said die elements on one of said chains defining V-shaped notches adapted to receive the apex portions of cooperating die elements on the other of said chains, the cooperating die elements on the feeding flights of said chains being adapted to receive an elongated metallic rod therebetween, and means for imparting feeding movement to said chains in a direction to cause the die elements on said feeding flights to receive and bend said rod into generally zig-zag form progressively from one end to the other thereof.

5. The structure defined in claim 4 in which the rod-engaging sides of said die elements define longitudinally-extended rod-receiving grooves, said grooves adjacent the apices of said die elements and the bases thereof having a depth substantially equal to one-half the thickness of said rod, the longitudinally intermediate portions of said grooves having a greater depth than the end portions thereof.

6. In a machine for making fabricated metal structures, a pair of cooperating forming devices adapted to receive an elongated metallic rod therebetween, each of said forming devices comprising a plurality of rod-engaging die elements, means pivotally connecting the die elements of each of said forming devices together to provide endless chains, means for imparting movement to said forming devices to cause said die elements to travel in a common feeding direction, the die elements of one of said devices engaging said rod at longitudinally spaced portions thereon, the die elements of the other of said forming devices each engaging said rod between an adjacent pair of the die elements of said one of the forming devices, engagement of said rod alternately by die elements on each of said forming devices causing the rod to be bent into generally zig-zag form progressively from one end to the other thereof, means for feeding a second relatively straight rod longitudinally in the direction of feeding movement of said die elements, a rod receiving guide channel for supporting said rods in coplanar relationship, and means for welding spaced portions of said bent rod to longitudinally spaced points on said relatively straight rod during movement of said rods through said guide channel.

7. In a machine for fabricating metal structures, means for feeding a pair of straight laterally spaced parallel metallic rods in a direction longitudinally thereof, rod-forming devices including cooperating die elements for bending a third metallic rod into an elongated generally zig-zag shape, means mounting said die elements for common feeding movements in a direction parallel to the direction of movement of said pair of straight rods and for rod-forming movements toward and away from each other in directions generally transversely of the direction of feeding movement, a pair of rod receiving guide channels for supporting said straight rods and formed rod in coplanar relationship, and means for welding the corners of the angles of said bent rod to longitudinally spaced portions of adjacent ones of said pair of rods during movement thereof through said guide channels, said last-mentioned means comprising, spaced welding devices each for a different one of said pair of spaced rods, each of said welding devices including a cylindrical rotor and a spoked rotor, the spoked rotors being disposed in planes which intersect each other at oblique angles and each having a plurality of radially outwardly projecting electrode elements cooperating with its cylindrical rotor to weld given corners of said bent rod to portions of the adjacent one of said pair of spaced rods, the electrode elements of one of said spoked rotors passing between adjacent electrode elements of the other spoked rotor during rotation thereof.

References Cited in the file of this patent

UNITED STATES PATENTS

| | | |
|---|---|---|
| 1,908,050 | Reed | May 9, 1933 |
| 2,004,409 | Hopkins | June 11, 1935 |
| 2,633,877 | Stockton | Apr. 7, 1953 |
| 2,700,991 | Stockton | Feb. 1, 1955 |